United States Patent

Ingram

[15] 3,691,883

[45] Sept. 19, 1972

[54] LATHE TOOL HOLDER

[72] Inventor: Maurice S. Ingram, P. O. Box 169, McHenry, Ill. 60050

[22] Filed: Sept. 22, 1970

[21] Appl. No.: 74,370

[52] U.S. Cl. ............82/34 R, 279/1 A, 279/83, 287/52.08, 408/239
[51] Int. Cl. ..................B23b 43/02, B23b 31/04
[58] Field of Search...279/1 A, 1 ME, 83; 287/52.08, 287/53 LK; 82/34, 31; 408/239, 238

[56] References Cited

UNITED STATES PATENTS

| | | | |
|---|---|---|---|
| 1,442,234 | 1/1923 | Petersen | 408/239 |
| 1,391,866 | 9/1921 | Stone | 287/52.08 |

FOREIGN PATENTS OR APPLICATIONS

| | | | |
|---|---|---|---|
| 818,147 | 10/1951 | Germany | 408/238 |

*Primary Examiner*—Francis S. Husar
*Attorney*—John S. O'Brien

[57] ABSTRACT

A tool holder for a lathe having a spindle provided with a tool shank-receiving tapered bore at one end and an external keyway extending longitudinally from such end comprises tool support means adapted for securing a tool against rotation relative thereto, key means projecting from the support means and adapted to be received in the keyway for securing the support means against rotation relative to the spindle, and means on the support means cooperative with the key means for mounting the support means on the spindle end to support a tool coaxially with the spindle.

2 Claims, 6 Drawing Figures

3,691,883

INVENTOR
MAURICE S. INGRAM

BY *John S. O'Brien*

ATTORNEY

LATHE TOOL HOLDER

BACKGROUND OF THE INVENTION

The invention relates to the problem of rotation or slippage of tapered shank tools, such as drills and reamers, when mounted in the tapered bore or socket of a lathe spindle. In drilling or reaming a work piece, the work is held in a chuck on the headstock of an engine lathe or the like and rotated, while the drill or reamer is non-rotatably held in the tailstock spindle and advanced toward the work. The tapered shank of the tool is tightly fitted into the tapered bore of the spindle, and the tool is kept from rotating or turning by the friction between the shank and the bore wall. However, the turning action of the work on the tool often causes the tool shank to turn in the spindle bore, as a result of which drilling is impeded, the tool becomes hung up in the work, and time is lost in removing the tool from the work and resetting the work on the chuck. Also, drill breakage occurs when the tool becomes hung up in the work and operation is continued, and when the tool is removed from the work. The shank turning or slippage also scores the bore wall and the tool shank, reducing their holding power and leading to greater slippage. The problem is especially pronounced where the work is constructed of the tougher and harder materials.

In the past, machinists have used lathe dogs to prevent the tools from turning in the spindle. The dog includes an annular portion that will slip over the body of a tool, and a set screw threaded therethrough into engagement with the tool, to hold the tool with respect to the dog. An arm projects from the annular portion, and it is arranged to abut against the lathe compound, to prevent the dog and thus the tool from turning. The lathe compound must be moved and adjusted so as to intercept the arm of the dog properly, requiring a certain amount of setup time, and the dog has limited holding power. The operation is susceptible of error, so that less experienced persons may run into trouble, resulting in broken bits and a personnel hazard.

SUMMARY OF THE INVENTION

The invention provides a tool holder for a lathe having a spindle provided with a tool shank-receiving tapered bore at one end and an external keyway extending longitudinally from such end, which includes tool support means adapted for securing a tool against rotation relative thereto, key means projecting from the support means and adapted to be received in the keyway for securing the support means against rotation relative to the spindle, and means on the support means cooperative with the key means for mounting the support means on the spindle end to support the tool coaxially with the spindle, the support means preferably being adapted to support a tapered shank tool with the shank thereof received in the spindle bore in frictional engagement with the bore wall. A new combination of the tool holder and the described lathe spindle also is provided.

In preferred embodiments of the invention, the tool support means comprises cylindrical sleeve means for receiving a tool therein, and set screw means engaging the sleeve means for securing the tool against rotation relative to the sleeve means. The cooperative means preferably comprises flange means, more particularly, second cylindrical sleeve means, adapted to extend over the spindle end, and set screw means engaging the flange means for securing the support means to the spindle with the key means received in the keyway. Employing the second sleeve means, the key means projects inwardly from the inner surface of such sleeve means for reception in the keyway. In a further preferred embodiment, the two sleeve means together comprise an integral one-piece body.

The tool holder of the invention as employed to secure a tapered shank tool on the lathe spindle adds to the holding force at the tapered surfaces and keeps the tool from turning in the spindle, particularly under heavy load. Work progresses rapidly, there is no lost time owing to hangup of the tools in the work, and tool breakage is minimized. Scoring of the spindle bore wall and of the tool shank is prevented, so that they may be used longer with maximum holding power with or without use of the new tool holder therewith, as circumstances may dictate. The tool holder also enables the machinist to utilize scored or worn spindles, and tools having scored or worn shanks, when such is necessary or desirable.

The invention eliminates the prior need to use lathe dogs, reduces the setup time required thereby, and provides better holding power. The new tool holder is easily and rapidly mounted on the lathe spindle and secured to a tool, so that the operation may be performed efficiently and correctly even by less experienced operators and without the problems occasioned by the use of lathe dogs.

The new tool holder also serves as an adapter for mounting various size tools and tools having shanks which do not seat in the spindle bore, such as straight shanks. In each use of the tool holder, the tool is positively secured to the lathe spindle, and the keyway provided in the spindle for another purpose is utilized very advantageously, to secure the tool holder and the tool against relative rotation or turning in operation.

The tool holder may be constructed in one size for each size of lathe spindle and serve to hold a variety of tools and tool sizes performing various functions. Also, the tool holder may be provided in several sizes if desired, to correspond to the more frequent tool size and type requirements. The tool holder may be used with drills having tapered or straight shanks for core drilling, two-step drilling and other drilling, with reamers having tapered or straight shanks and including taper, shell and other reamers, and with taps for straight, Acme, pipe and other tapping.

A lathe need not be modified or adjusted to use the new tool holder. As regards the tools, it is recommended only that they be provided with flats for engagement with set screws and thereby maximum holding power, where flats are not ordinarily present in the appropriate locations.

The body of the tool holder may be constructed readily and economically as a casting, and but relatively few operations are needed to complete the structure for use. Alternatively, the tool holder body may be constructed in separate parts, which may be joined by suitable connections, if such be desired for accommodating diverse tool sizes and/or tool shank configurations.

DESCRIPTION OF THE DRAWINGS

The attached drawings illustrate preferred embodiments of the invention, without limitation thereto. In the drawings, like elements are identified by like reference symbols in each of the views, and.

DESCRIPTION OF THE PREFERRED EMBODIMENTS

Figure 1:
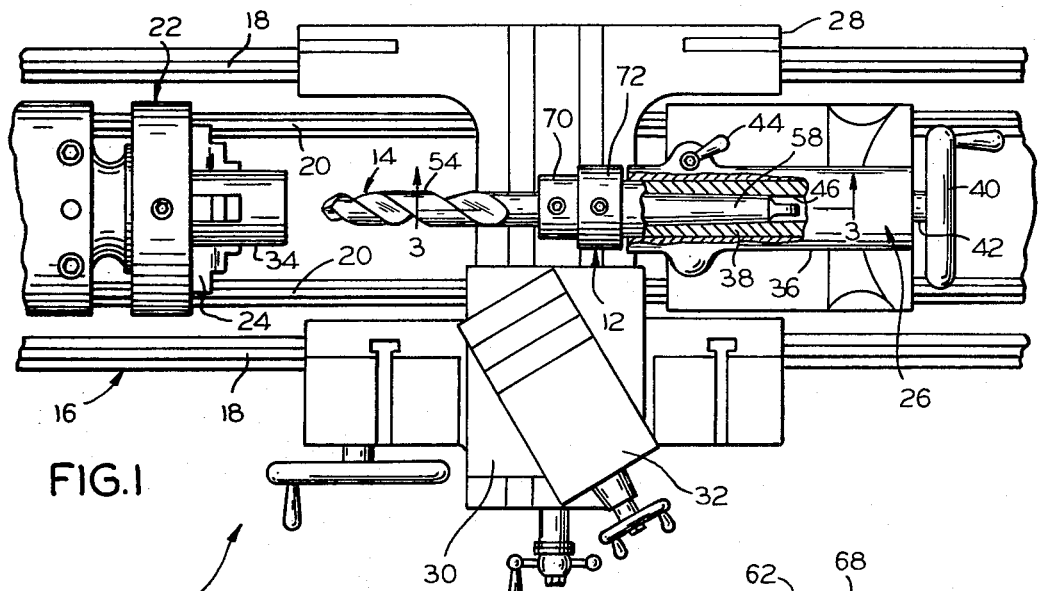
FIG. 1 is a fragmentary top plan view of a conventional engine lathe with parts broken away and in section, illustrating the tool holder of the invention mounted thereon to secure a drill.

Referring to the drawings, a conventional engine lathe 10 is illustrated in FIG. 1 with a tool holder 12 constructed according to the invention mounted thereon for securing a twist drill 14 in the lathe. The lathe includes a bed or body 16 having ways 18 and 20 thereon, a headstock 22 having a chuck 24 thereon, a tailstock 26, a carriage 28, a cross slide 30 mounted on the carriage, and a compound rest 32 mounted on the cross slide, all constructed and arranged in conventional manner. A work piece is secured on the chuck 24 and is rotated during operation, while the drill 14 is moved into the work piece by operation of the tailstock 26.

The invention is concerned principally with the construction and operation of the tailstock 26, and the cooperation of the tool holder 12 mounted thereon to secure the drill in the lathe. The tailstock includes a fixed generally cylindrical tubular body 36 and a generally cylindrical tubular spindle 38 axially reciprocal therein. The tailstock includes a spindle wheel 40 mounted on a threaded shaft 42 which threadedly engages the spindle 38 for reciprocating the spindle and also serving for ejection of the drill 14 or other tool mounted in the spindle. A locking lever 44 on the tailstock body 36 is operated to lock the spindle 38 in a desired position.

Figure 3:
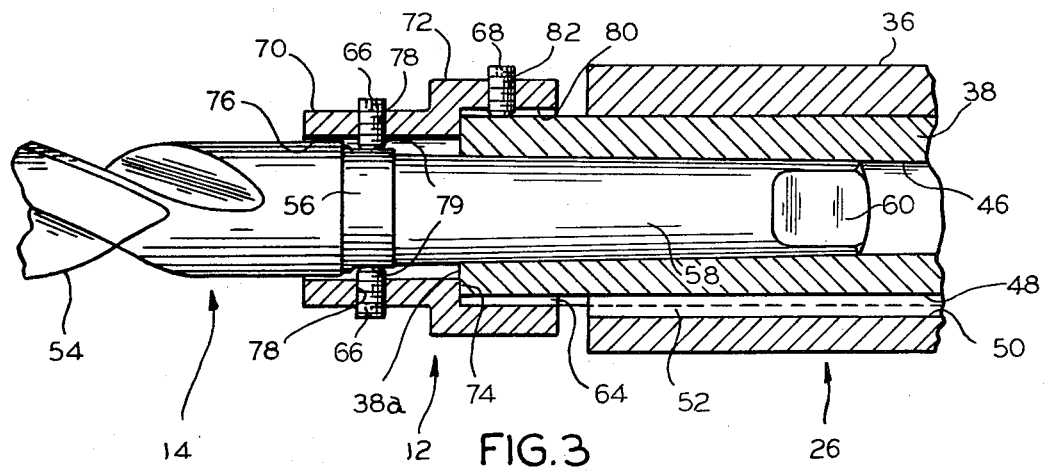
FIG. 3 is a fragmentary sectional view of parts of the lathe and of the tool holder, taken substantially on line 3—3 of FIG. 1, showing the drill mounted therein.

Referring to FIG. 3, the tailstock spindle 38 is provided with a central conically tapered bore or socket 46 extending and converging inwardly from its outer end 38a, the bore ultimately assuming a cylindrical configuration and being provided with threaded nut means, not shown, for engagement with the shaft 42 illustrated in FIG. 1. The tapered bore 46 serves to receive a tool shank having a like taper therein.

The tailstock spindle 38 conventionally is provided with an external keyway 48 extending from the outer end 38a longitudinally of the spindle. A complementary keyway 50 is provided in the inner wall of the tailstock body 36, and a key 52 is secured in the latter keyway 50 for reception in the spindle keyway 48, to prevent the spindle 38 from turning in operation while permitting axial reciprocation of the spindle by operation of the spindle wheel 40. The tool holder 12 cooperates with the spindle keyway 48 to provide the improved results of the invention.

The illustrative twist drill 14 includes a fluted body 54, an intermediate slightly reduced cylindrical ring portion 56, a shank 58 of slightly reduced diameter tapering inwardly from the ring portion, and a terminal tang 60. The drill is constructed for mounting its tapered shank 58 in the tapered bore 46 of the spindle 38, as illustrated in FIGS. 1 and 3. The taper is such that the surfaces of the shank and the bore wall are in frictional interengagement with sufficient holding power to prevent the drill from turning in the spindle as the drill is advanced into the work piece 34 in drilling the piece. However, with increasing work loads, the drill is prone to turn in the spindle bore 46, with the above-described disadvantageous and harmful results. Consequently, it has been the practice in the past to secure a lathe dog around the drill at a suitable location adjacent the inner end of the fluted body 54. The compound rest 32 then was arranged with the dog to prevent the dog from turning, thereby preventing the drill from turning under excessive load. The use of the dog had the disadvantages described above, and moreover, the drill could be damaged owing to a tendency of the engaging screw on the dog to chip the drill body and the flutes thereof.

Figure 2:
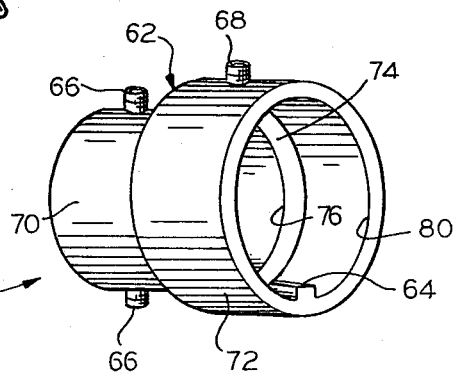
FIG. 2 is a perspective view of the tool holder.

Referring to FIGS. 2 and 3, the tool holder 12 in a preferred embodiment of the invention includes an integral one-piece body 62, an integral key 64, and set screws 66 and 68 in threaded engagement with the body. The body includes a tubular cylindrical tool support sleeve 70, a tubular cylindrical mounting sleeve or flange 72 of greater diameter coaxial with the support sleeve 70 and projecting axially therefrom, and an annular shoulder or wall 74 between the sleeves and integrally joining them in the one-piece body 62.

The support sleeve 70 has a central cylindrical opening 76 which receives the drill body 54 and the ring portion 56 of the drill relatively closely therein and coaxially therewith. Two diametrically opposed threaded screw openings 78 extend through the support sleeve 70, and the set screws 66 are inserted in the openings in threaded engagement with the sleeve. As illustrated in FIG. 3, a pair of diametrically opposed flats 79 preferably is provided on the drill 14, in the ring portion 56 or in another suitable location if preferred. The set screws 66 engage the drill on the flats, to prevent the drill from turning relative to the support sleeve 70 and the holder 12. The assembly of the support sleeve 70 and the set screws 66 thus constitutes tool support means adapted for securing a tool against rotation relative thereto.

The mounting sleeve 72 is provided with a central cylindrical opening 80 closely receiving the outer end 38a of the spindle coaxially therein, with the spindle end 38a preferably abutting on the shoulder 74. In the illustrative embodiment, the key 64 is integral with the wall of the sleeve opening 80, extends longitudinally or in the axial direction thereof, and projects inwardly therefrom for reception in the spindle keyway 48. The key 64 thus projects from the support sleeve 70 and is adapted to be received in the spindle keyway 48 for securing the tool support means against rotation relative to the spindle.

A threaded opening 82 is provided in the mounting sleeve 72 in diametrically opposed relation to the key 64. The set screw 68 is received in the opening 82 in threaded engagement with the sleeve, and it engages the outer surface of the spindle 38 adjacent its outer end 38a. The set screw 68 in the flange structure of the sleeve 72 in engagement therewith serves to secure the key 64 properly in the spindle keyway 48, cooperate with the key for mounting the tool support means on the spindle 38, and secure the support means to the spindle. In the preferred embodiments of the invention, the drill 14 or other tapered shank tool may be supported with the shank 58 thereof received in the tapered bore 46 in frictional engagement therewith, as illustrated in FIGS. 1 and 3.

Employing a tool holder 12 with the drill 14, as illustrated in FIGS. 1 and 3, the drill is mounted in the spindle 38 with its tapered shank 58 engaged in the spindle bore 46, in the conventional manner. The tool holder 12 is mounted on the spindle end 38a, simply by slipping the mounting sleeve 72 over the end while inserting the holder key 64 in the spindle keyway 48, with the spindle end projecting or extending longitudinally outwardly from the tailstock body 36. The mounting sleeve set screw 68 is tightened into engagement with the spindle 38, to secure the holder on the spindle with the key 64 in place. The support sleeve set screws 66 are tightened against the flats 79 on the drill 14, to secure the drill against rotation relative to the holder 12 and to the spindle 38, thereby adding the holding force of the holder to the holding force provided by the engaging tapered surfaces and preventing the drill from rotating or turning under heavy work loads. The lathe then may be operated in the usual manner. Thereafter, the drill 14 may be removed simply by loosening the support sleeve set screws 66 and withdrawing the drill from the spindle 38. If it be desired to remove the holder 12, it is necessary merely to loosen the mounting sleeve set screw 68 and withdraw the holder from the spindle 38.

Figure 4:
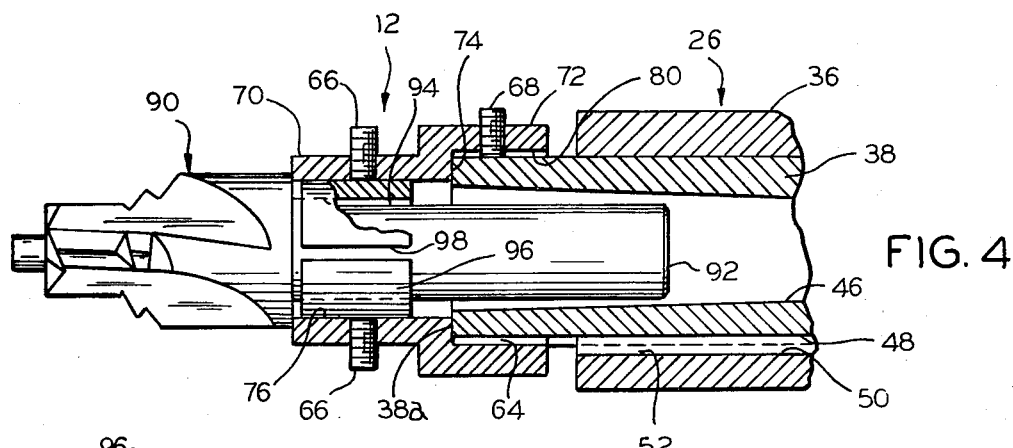
FIG. 4 is a view similar to FIG. 3, illustrating the mounting of a counterbore tool on the lathe, employing the tool holder.
Figure 5:
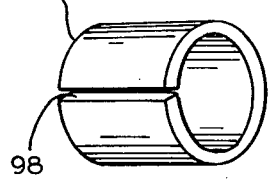
FIG. 5 is a perspective view of a split bushing employed with the tool holder as illustrated in FIG. 4.

The tool holder 12 may serve as an adapter for mounting straight shank tools on the lathe, as illustrated in FIG. 4. A counterbore tool 90 is illustrated, and it has a straight cylindrically shaped shank 92 provided with a longitudinally extending flat 94. The shank 92 has a smaller diameter than the diameter of the support sleeve opening 76. Proper alignment of the tool in the holder is obtained by interposing a split bushing 96 between the shank 92 and the inner surface of the support sleeve 70. The bushing is a cylindrical tubular member having a longitudinal slot 98 therethrough, whereby adjacent longitudinally extending edges of the bushing are spaced apart to provide for reducing the effective diameter thereof.

The shank 92 of the counterbore tool 90 is inserted through the bushing 96, in turn mounted within the support sleeve 70 between the set screws 66. The shank 92, of lesser diameter than the spindle bore 46, is received therein. Upon tightening the support sleeve set screws 66, the tool is clamped in place and secured against rotation. In an alternative embodiment, not illustrated, the bushing 96 may be provided with diametrically opposed holes extending therethrough in register with the set screws 66, so that the screws engage the tool shank 92. In this case, one of the screws 66 will engage the flat 94.

The tool holder 12 thus serves to mount the counterbore 90 and other tools not having a tapered shank on the spindle 38 and to secure the tool against rotation under load. While the holding force resisting rotation is less than where the tool is provided with a tapered shank engaged in the spindle bore 46, it nevertheless is sufficient for many uses. The tool is, furthermore, positively connected to the spindle 38, so that it may be backed off or withdrawn from the work piece 34 while being completely supported by the spindle.

Figure 6:
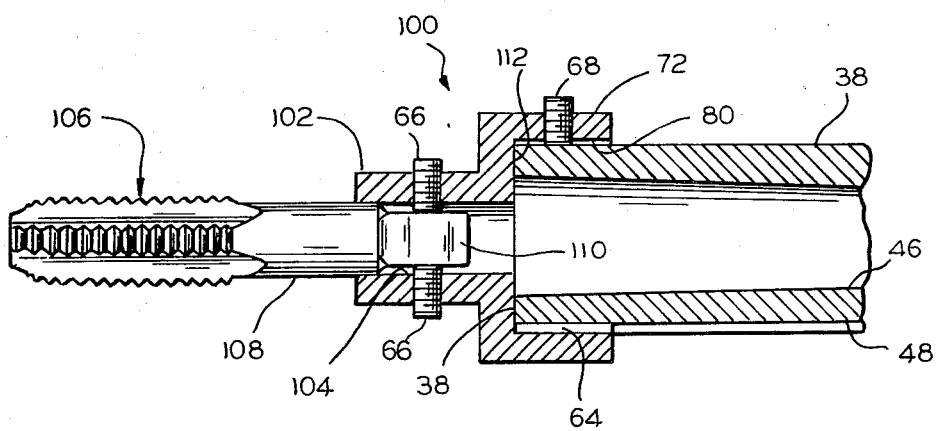
FIG. 6 is a view similar to FIG. 3, illustrating another embodiment of the tool holder as employed for securing a thread tap on the lathe.

FIG. 6 illustrates a tool holder 100 constituting another embodiment of the invention, which serves for mounting a tool having a smaller shank diameter on the same spindle 38. The holder 100 has a tool support sleeve 102 like the support sleeve 70 of the preceding embodiment, but having a smaller diameter opening 104 than the opening 76 of the preceding embodiment. A thread tap 106 is mounted in the sleeve opening 104. The tap includes a straight cylindrical shank 108 and a square end 110. The tool end and a portion of the shank are inserted in the sleeve opening 104, and the set screws 66 engaging the support sleeve 102 are tightened into engagement with opposite flat sides of the square end. The lathe then may be operated for tapping the work piece 34, while the tap is secured to the spindle 38 and prevented from rotating.

It will be apparent that the tool holder 12 and the bushing 96 of FIG. 4, and the tool holder 100 of FIG. 6 may be employed alternatively for mounting tools having lesser shank diameters than the drill 14, including both straight shank and tapered shank tools. Lesser diameter tapered shank tools further may be mounted so as to utilize the holding force of the tool and spindle tapered surfaces, by employing a conventional shank adapter, not shown, having a tapered bore for receiving the tool shank, and a tapered external surface which is received in the spindle bore 46. Such adapters protrude a short distance from the outer end 38a of the spindle, and it is necessary to space the shoulder 112 of the holder 100 outwardly from the spindle end, dimensioning the mounting sleeve 72 correspondingly, so as to receive the projecting portion of the adapter within the mounting sleeve 72. Similar provision may be made for employing the tool holder 12 with such a shank adapter.

In another alternative, a tapered shank tap driver, not shown, may be mounted in engagement with the spindle bore 46 and secured to the spindle 38 by the tool holder 12, in a manner similar to the drill 14, as shown in FIGS. 1 and 3. A thread tap such as the tap 106 of FIG. 6 is mounted in the tap driver, and the tap driver and the tap thus are secured against rotation during operation of the lathe.

Different size tool holders, such as the holders 12 and 100, are provided for different size lathes, having different size spindles 38 and bores 46 therein. Likewise, the sizes of the keyway 48 vary with the different size lathes, and the tool holder key 64 is sized accordingly. Dependent upon work requirements, a tool holder 12 dimensioned for the drill size appropriate for a particular lathe is provided, and size modifications of the holder, such as the holder 100, also may be provided. Further modifications that may be employed, which are not illustrated, include modified tool support means connected to the mounting sleeve 72, such as a square socket for receiving the square tap end 110 shown in FIG. 6. However, the illustrative embodiments are preferred for their greater adaptability to a variety of tool shanks, and ease and economy of manufacture.

While support sleeve members 70 and 102, and a mounting sleeve member 72 of continuous cylindrical configuration are illustrated and preferred for maximum strength and resistance to torsion, it will be apparent that these members can be modified while functioning in the same manner. Thus, for example, the key 64 and the mounting screw 68 may be associated with individual flanges projecting from the shoulders 74 and 112, which need not be continuous around the periphery of the tool holder.

While the tool holder key 64 is integral with the mounting sleeve 72, it may be constructed separately and inserted in a corresponding keyway in the mounting sleeve, as may be most desirable for manufacturing, strength, or other purposes. It is also contemplated that the tool holder of the invention may be constructed with separate tool support and mounting sleeves, to provide for interchanging parts to accommodate different tool and/or spindle sizes. The illustrative integral one-piece embodiments of the body 62 or the like are, however, desirable from the standpoints of manufacturing ease and economy, and simplicity of use. The body 62 may be cast integrally of iron or steel, while the set screws 66 and 68, and the key 64 where separately mounted, are constructed of suitable steel.

The invention thus provides a tool holder which may be employed on a conventional lathe to secure various tools thereon and prevent the tools from rotating in operation, increasing operating efficiency and avoiding tool hangup, tool breakage, and lost time. The tool holder is constructed for cooperation with the lathe spindle, particularly the keyway 48 thereof already present on the spindle. No modification of the lathe is required, nor is it necessary to adjust the compound or any other structure of the lathe. The tool holder provides augmented holding force when using tapered shank tools, with the aforesaid advantages and with the prevention of spindle bore and tool shank scoring. The tool holder serves for mounting tools not provided with tapered shanks, securing them against rotation in operation and providing a positive connection to the spindle. The tool holder will accommodate various tools as conventionally supplied or in some cases with the preferred provision of flats in curved surfaces for optimum engagement with the tool support set screws 66.

While preferred embodiments of the invention have been described and illustrated, and modifications thereof have been described, it will be apparent to those skilled in the art that various changes and modifications may be made therein within the spirit and scope of the invention. It is intended that all such changes and modifications be included within the scope of the appended claims.

I claim:

1. In combination with a lathe spindle provided with a tool shank-receiving tapered bore at one end and an external keyway extending from said end longitudinally of the spindle, a tool holder mounted on said spindle end and comprising:
    a cylindrical sleeve for receiving a tool therein,
    set screw means engaging said sleeve for securing a tool therein against rotation relative to the sleeve,
    a cylindrical sleeve projecting from said tool-receiving sleeve for receiving said spindle end therein to mount the tool-receiving sleeve on the spindle for supporting a tool coaxially with the spindle, whereby a tapered shank tool may be supported with the shank thereof received in said bore in frictional engagement with the bore wall,
    key means projecting inwardly from the inner surface of said projecting sleeve for reception in said keyway to secure said tool-receiving sleeve against rotation relative to said spindle, and
    set screw means engaging said projecting sleeve for securing said tool-receiving sleeve to said spindle with said key means received in said keyway.

2. A combination as defined in claim 1 wherein said sleeves together comprise an integral one-piece body.

* * * * *